US012345281B2

(12) United States Patent
Freuer

(10) Patent No.: US 12,345,281 B2
(45) Date of Patent: Jul. 1, 2025

(54) METHOD FOR CONTROLLING A GEAR PUMP

(71) Applicant: Dr. Ing. h.c. F. Porsche Aktiengesellschaft, Stuttgart (DE)

(72) Inventor: Andreas Freuer, Ludwigsburg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 42 days.

(21) Appl. No.: 18/514,343

(22) Filed: Nov. 20, 2023

(65) Prior Publication Data

US 2024/0239188 A1 Jul. 18, 2024

(30) Foreign Application Priority Data

Jan. 13, 2023 (DE) ..................... 10 2023 100 702.5

(51) Int. Cl.

| | |
|---|---|
| ***F15B 21/00*** | (2006.01) |
| ***F04C 14/08*** | (2006.01) |
| ***F04C 14/28*** | (2006.01) |
| ***F04C 15/00*** | (2006.01) |

(52) U.S. Cl.

CPC ............ *F15B 21/008* (2013.01); *F04C 14/08* (2013.01); *F04C 14/28* (2013.01); *F04C 15/0049* (2013.01); *F04C 2270/035* (2013.01); *F04C 2270/052* (2013.01)

(58) Field of Classification Search

CPC ........ F15B 21/008; F04C 14/08; F04C 14/28; F04C 15/0049; F04C 2270/03; F04C 2270/035; F04C 2270/05; F04C 2270/051; F04C 2270/052; F04C 2270/0525; F04C 28/28; F04C 28/08

See application file for complete search history.

(56) References Cited

U.S. PATENT DOCUMENTS

2010/0322805 A1* 12/2010 Aregger .................. F04C 14/08 418/2

FOREIGN PATENT DOCUMENTS

| | | | |
|---|---|---|---|
| DE | 102011121837 | A1 | 6/2013 |
| DE | 102013216342 | A1 | 2/2015 |
| DE | 102013217307 | A1 | 3/2015 |
| WO | 2022011013 | A1 | 1/2022 |

OTHER PUBLICATIONS

Great Britain Search Report for Application No. GB2400431.9, dated Jun. 14, 2024. (1 page).

* cited by examiner

*Primary Examiner* — Bryan M Lettman

(74) *Attorney, Agent, or Firm* — Buchanan Ingersoll & Rooney PC

(57) ABSTRACT

A method for controlling a gear pump by a control device to compensate a tooth engagement-induced volume flow pulsation to reduce noise emissions. The method includes acquiring a gear angle and an actual speed of the gear pump; keeping a relationship between a respective modulation angle and an amplitude of a pilot control torque of the gear pump to compensate the volume flow pulsation to an actual speed; modulating the pilot control torque on the basis of the acquired gear angle, a predetermined correction angle, the modulation angle, a number of teeth of the gear pump and the amplitude; and driving the gear pump with a drive torque overlaid with the modulated pilot control torque. The modulation angle is calculated using a PT element with the actual speed as the input variable.

7 Claims, 4 Drawing Sheets

METHOD FOR CONTROLLING A GEAR PUMP

CROSS-REFERENCE TO RELATED APPLICATION

This application claims priority to German Patent Application No. 10 2023 100 702.5, filed Jan. 13, 2023, the content of such application being incorporated by reference herein in its entirety.

FIELD OF THE INVENTION

The invention relates to a method for controlling a gear pump, a gear pump which can be operated using such a method, a chassis hydraulics comprising such a gear pump, and a motor vehicle comprising such a chassis hydraulics.

BACKGROUND OF THE INVENTION

Differential pressure-regulated gear pumps which are used in the chassis hydraulics of motor vehicles, for example, are known from industrial practice. The gear pumps convey a fluid, for example the hydraulic fluid of the chassis hydraulics, through the rotational engagement of an internal gear in a complementary external gear ring. This creates a fluctuation of the differential pressure or the flow rate of the fluid. These fluctuations are sinusoidal, wherein the order of the respective sinusoidal oscillation depends on the tooth count, i.e., the number of teeth, of the gear pump. These sinusoidal pressure fluctuations in the fluid lead to noise, which can have a negative effect on the driving experience.

SUMMARY OF THE INVENTION

The invention relates to a method for controlling a gear pump by means of a control device, to compensate a tooth engagement-induced volume flow pulsation, wherein the control device at least comprises the following components:

an acquisition unit;

a computing device; and a memory device, wherein the method at least comprises the following steps:

a. by means of the acquisition unit, acquiring a gear angle and an actual speed of the gear pump;

b. by means of the memory device, keeping a relationship between a respective modulation angle and an amplitude of a pilot control torque of the gear pump to compensate the volume flow pulsation to an actual speed of the gear pump;

c. by means of the computing device, modulating the pilot control torque on the basis of the acquired gear angle, a predetermined correction angle, the modulation angle, a number of teeth of the gear pump and the amplitude;

wherein the modulation angle is calculated using a PT element with the actual speed as the input variable;

d. by means of a drive unit, driving the gear pump with a drive torque overlaid with the modulated pilot control torque.

Unless explicitly stated otherwise, ordinal numbers are used in the preceding and the following description only for the purposes of clear distinction and do not reflect any order or ranking of the designated components. An ordinal number greater than one does not imply that another such component has to necessarily be present.

A method for controlling a gear pump by means of a control device to compensate a tooth engagement-induced volume flow pulsation is now proposed. Each tooth engagement results in a sinusoidal fluctuation in a fluid flow of a fluid conveyed by the gear pump. The fluctuation in the fluid flow is in a range of 5%, preferably 2%, around a fluid flow average value, for example.

To equalize the fluctuation, a pilot control torque is now modulated, which can be overlaid onto a drive torque of the gear pump to compensate the fluctuations in the fluid flow caused by the tooth engagement. The modulated torque can be used to influence or modulate the speed of the pump. Changing or modulating the speed. Changes or modulates the fluid flow. The pilot control torque is modulated in such a way that it compensates, i.e., equalizes or reduces, the tooth engagement-induced fluctuations in the fluid flow.

In a step a., a gear angle is acquired by means of the angle encoder. The gear angle is an angle of a drive shaft of the gear pump, for example. The angle is measured by means of an angle encoder using a reference point on the shaft, for example. An actual speed is acquired as well. The actual speed is a speed of a gear, preferably an internal gear, of the gear pump or the drive shaft, for example. The actual speed is preferably also determined by means of the angle encoder or with a separate measuring device. The acquisition unit accordingly comprises an angle encoder and/or a tachometer.

The pilot control torque is defined via a phase or a phase angle and an amplitude. In step b. now, a relationship between a modulation angle for determining the phase of the pilot control torque and the actual speed of the gear pump is kept on the memory device. The relationship between the modulation angle and the actual speed includes a characteristic diagram, an analytical description, for instance a model, or another algorithm, for example. A relationship between the amplitude of the pilot control torque and the actual speed of the gear pump is kept on the memory device as well. The relationship between the amplitude and the actual speed includes a characteristic diagram, an analytical description, for instance a model, or another algorithm, for example.

In a step c., the pilot control torque is modulated by means of a computing device on the basis of the acquired gear angle, a predetermined correction angle, the modulation angle, a number of teeth of the gear pump and the amplitude.

The predetermined correction angle is preferably a constant value specifically assigned to each individual gear pump. The predetermined correction angle preferably specifies a relationship between a tooth engagement and the gear angle and thus depends on the installation position of the internal gear and a reference point on the drive shaft for determining the gear angle, for example, or on the installation position of the internal gear in the gear ring of an internal gear pump.

The modulation angle is calculated in a step c1. On the basis of the actual speed using a PT element. The modulation angle is preferably the phase correction for the transmission behavior of the torque controller and the electrical path (to generate phase currents and electrical fields in the drive unit of the gear pump) in relation to the shaft speed. The PT element is preferably a PT1 element. In other words, the transmission behavior can be modulated to a good approximation as a PT element with dead time. The modulation angle therefore preferably results from the formula:

$$1.1:\ \varphi_{\overline{M}} = \frac{1}{a} \cdot \left[-\arctan\left(\frac{\pi}{2} \cdot |n_{ist}| \cdot \tau_M\right) - \frac{\pi}{2} \cdot T_{tot} \cdot |n_{ist}|\right]$$

$\varphi_{\overline{M}}$ is the modulation angle, a is the number of teeth, $n_{ist}$ is the actual speed, $\tau_M$ is a time constant and $T_{tot}$ is a dead time of the torque controller.

The thus modulated pilot control torque is superpositioned with a drive torque of the gear pump, for example by means of the computing device. The pilot control torque is substantially wave-shaped; it preferably substantially has the shape of the fluctuations of the fluid flow, is particularly preferably substantially sinusoidal.

In a step d., the gear pump is then driven by means of the drive torque overlaid with the pilot control torque. The drive torque is provided by means of a drive unit controlled by the control device, preferably an electric motor. A torque controller is used.

The thus modulated pilot control torque produces a speed oscillation. The transmission behavior from the pilot control torque to the speed is integrating. The phase offset from the pilot control torque to the speed oscillation is therefore 90° (ninety degrees). The speed oscillation in turn produces an oscillation in the fluid flow which compensates, i.e., reduces or equalizes, the fluctuation in the fluid flow caused by the tooth engagement, also referred to as the volume flow pulsation. There is preferably a phase offset of 180° (one hundred and eighty degrees) between the speed oscillation and the volume flow pulsation, so that the speed reaches a maximum at the same time or at the same gear angle as when the fluid flow or the volume flow pulsation reaches a minimum.

A tooth engagement produces a wave of the volume flow pulsation. In other words, a tooth engagement extends over a phase angle of 360° (three hundred and sixty degrees), i.e., a maximum and a minimum of the fluid flow. The relationship between the phase angle and the gear angle therefore depends on the tooth pitch or the number of teeth. The phase angle is an xth part (1/x) of the gear angle. If the gears of the gear pump have 15 (fifteen) teeth, for example, a full phase cycle, i.e., 360° (three hundred and sixty degrees), of the phase angle corresponds to a gear angle of 24° (twenty-four degrees). In such a case, therefore, the oscillation is an oscillation of the $15^{th}$ order (fifteenth order). The number of teeth of the gear of which the gear angle is being acquired has to be taken into account. This is preferably the driven gear, the gear angle of which is acquired via the drive shaft; particularly preferably the internal gear of an internal gear pump.

The proposed method can be used to compensate volume flow pulsation and thus avoid unwanted noises.

In an advantageous embodiment of the method, it is further proposed that the predetermined correction angle be determined in a step e.—by means of a, preferably one-time, preliminary calibration measurement.

According to this embodiment, it is now proposed that the predetermined correction angle be determined in a step e. of a preliminary calibration measurement. The preliminary calibration measurement is preferably carried out once at the factory.

In the preliminary calibration measurement, a specific test speed, a specific test torque and a specific test differential pressure, for example, are set on the gear pump. A preferably sinusoidal test oscillation is iteratively applied to the test torque and the differential pressure level is measured. The test phase angle of the test torque is shifted to iteratively determine the test phase angle having the lowest differential pressure level.

For each iterative measurement of the differential pressure level, the test phase angle of the test torque is shifted by no more than 2° (two degrees), no more than 1° (one degree) or no more than 0.5° (half a degree) of the gear angle, for example. The test phase angle is preferably shifted over a tooth engagement, i.e., in the case of 15 (fifteen) teeth over a gear angle range of 24° (twenty-four degrees). The differential pressure level is calculated using a fast Fourier transform or a bandpass filter, for instance.

This results in a test angle of $$2.1:\ \varphi_{Test}^{\psi} = i^* \cdot \frac{\pi}{180}$$

wherein i* is the distance of the test phase angle: $\varphi_{Test}^{\Psi}$, with which the differential pressure level is the lowest, relative to a zero crossing of the gear angle in ° (degrees).

The predetermined correction angle is determined on the basis of the test angle, for example using the following formula:

$$2.2:\ \varphi_k = i^* \cdot \frac{\pi}{180} - \frac{1}{a} \cdot \left[-\arctan\left(\frac{\pi}{2} \cdot |n_{Test}| \cdot \tau_M\right) - \frac{\pi}{2} \cdot \Delta T_{tot} \cdot |n_{Test}|\right]$$

a is the number of teeth of the gear or the tooth engagement per 360° of the gear angle, $n_{Test}$ is the test speed, $\tau_M$ is the time constant and $\Delta T_{tot}$ is the dead time of the torque controller. The phase delay in the torque build-up during the preliminary calibration measurement is corrected using the negative correction term, which includes the dead time $\Delta T_{tot}$.

The predetermined correction angle is therefore an offset value for defining the tooth engagement behavior, and with it the volume flow pulsation, in relation to the gear angle.

This embodiment provides an accurate determination of the phase angle of the pilot control torque and thus good compensation of the volume flow pulsation.

In an advantageous embodiment of the method, it is further proposed that, in a step c2., the amplitude of the pilot control torque be modulated using an actual amplitude which is dependent on the actual speed and a correction factor which is dependent on the speed.

According to this embodiment, the amplitude of the pilot control torque is then modulated on the basis of an actual amplitude and a correction factor in a step c2., which is part of step c. The correction factor is preferably determined using a characteristic diagram kept by the memory device. The data stored in the characteristic diagram corresponds substantially to the following formula, for example:

$$3.1:\ f_{korr} = \sqrt{1 + \left(\frac{\pi}{2} \cdot |n_{ist}| \cdot \tau_M\right)^2}$$

The actual amplitude is, for instance, dependent on the actual speed, a pulsation factor and an inertia factor. The pulsation factor and the inertia factor are dependent on the fluid being used and the gear pump. The pulsation factor is less than 0.1, for example, for instance between 0.01 and 0.05. The inertia factor is less than 0.001, for example, for instance between 0.0001 and 0.0005.

In an advantageous embodiment of the method, it is further proposed that, in step c2., the actual amplitude be further determined as a function of a leakage factor, wherein the leakage factor is preferably dependent on the speed and the differential pressure at the gear pump.

According to this embodiment, the actual amplitude is now further calculated in step c2. On the basis of a leakage factor. The leakage factor preferably corresponds to a speed which has been reduced by a leakage value and is calculated using the following formula:

$$3.2\text{:}\ \tilde{n}_{ist} = n_{ist} - \frac{1}{v_s} \cdot \left[ f_{Leck_{\Delta p}} \cdot \Delta p + f_{Leck_n} \cdot n_{ist} \right]$$

$\tilde{n}_{ist}$ is a speed reduced by a leakage, $n_{ist}$ is the actual speed and $\Delta p$ is the differential pressure at the gear pump, $$f_{Leck_n},\ f_{Leck_{\Delta p}}\ und\ \frac{1}{v_s}$$

are constant factors which depend on the gear pump and the fluid.

The actual amplitude is therefore calculated according to the formula:

$$3.3\text{:}\ \overline{M}_{n_{ist}} = \psi \cdot \frac{\pi^2}{60} \cdot |\tilde{n}_{ist}| \cdot n_{ist} \cdot f_p$$

$\psi$ is the inertia factor and $f_p$ is the pulsation factor.

Overall, the modulated amplitude of the pilot control torque is thus preferably calculated using the formula:

$$3.4\text{:}\ \overline{M}_n = \sqrt{1 + \left(\frac{\pi}{2} \cdot |n_{ist}| \cdot \tau_n\right)^2} \cdot \underbrace{\psi \cdot \frac{\pi^2}{60} \cdot |\tilde{n}_{ist}| \cdot n_{ist} \cdot f_p}_{\overline{M}_{n_{ist}}}$$

The formula for the pilot control torque is therefore, for example:

$$M_n = \overline{M}_n \cdot \sin[15 \cdot (\varphi_w - \varphi_k - \varphi_{\overline{M}})]. \quad 3.5\text{:}$$

In an advantageous embodiment of the method, it is further proposed that the correction factor of the amplitude and/or the modulation angle be determined continuously.

According to this embodiment, the amplitude and/or the modulation angle are determined continuously and the gear pump is thus continuously regulated.

This embodiment enables dynamic regulation of the gear pump with continuous noise suppression.

In an advantageous embodiment of the method, it is further proposed that a maximum value limitation of the pilot control torque be carried out in a step f.

According to this embodiment, an overreaction of the control system, for example, can be excluded.

In an advantageous embodiment of the method, it is further proposed that, in a step g., the pilot control torque modulated in step c. be regulated by means of a regulation factor, wherein the regulation factor is determined as a function of the vehicle speed, the differential pressure and/or the actual speed.

According to this embodiment, the pilot control torque is regulated, i.e., dimmed, by means of a regulation factor. The regulation factor preferably has a value between 0 and 1. The regulation factor is determined as a function of the vehicle speed, the differential pressure and/or the actual speed. A respective regulation factor is preferably determined as a function of the vehicle speed, the differential pressure and/or the actual speed. Particularly preferably, the smallest regulation factor of the three determined regulation factors is then selected to regulate the pilot control torque.

This embodiment makes it possible to adapt the torque control of the gear pump to the current driving situation or the state of the hydraulic device. This embodiment thus enables a particularly high level of ride comfort with efficient noise suppression, even at low vehicle speeds for instance.

In another aspect, a gear pump is proposed, comprising
- an internal gear;
- an external gear ring which is complementary to the internal gear;
- a drive unit for providing a regulated torque;
- a control device for regulating the regulated torque on the basis of the modulated pilot control torque.

The gear pump is primarily characterized in that the control device is configured to carry out a method according to an embodiment according to the above description.

The gear pump is preferably an internal gear pump; particularly preferably a crescent gear pump. The gear pump preferably comprises an angle encoder and a differential pressure meter, as well as a tachometer, for example.

In a gear pump, two gears, one of which is driven, engage in one another. At an inlet opening in the pump housing, there is a gap or a cavity in a pair of teeth, i.e., between the respective one tooth of each of the two gears. Rotation causes the pair of teeth to move from the inlet opening to an outlet opening. The cavity or gap is reduced, for example, so that the pressure increases and the fluid is pushed out through the outlet opening.

The pump, or the driven gear of the gear pump (in the case of an internal gear pump, preferably the internal gear) is driven by a regulated torque. For this purpose, the driven gear of the gear pump is connected, preferably via a shaft, to a drive unit, preferably an electric motor, in a torque-transmitting manner.

The control device is configured to carry out a method according to the above description in order to modulate a pilot control torque. The pilot control torque is overlaid with a drive torque. This results in the regulated torque with which the gear pump is driven, or the drive unit is controlled.

In another aspect, a chassis hydraulics is proposed, comprising
- a hydraulic damper device, and
- a gear pump according to an embodiment according to the above description for controlling the damper device by means of a hydraulic fluid.

The here-proposed chassis hydraulics are disposed in an assembled state between a chassis or the wheels and a body of a motor vehicle, and equalize acceleration and movement between the chassis and the structure. Yaw movements, pitching movements and rolling movements, for example, can thus be damped.

For this purpose, the chassis hydraulics include a hydraulic damper device, which preferably comprises a cylinder with a piston and is in fluid communication with a gear pump according to the above description.

In another aspect, a motor vehicle is proposed, comprising
- a plurality of wheels, of which at least one is configured as a drive wheel;
- a vehicle body;

- a drive motor which is in torque-transmitting connection with the at least one drive wheel to provide a drive torque; and
- a chassis hydraulics according to Ans H, which connects the vehicle body to the plurality of wheels.

A motor vehicle is proposed here, which comprises a chassis hydraulics according to the above description. The motor vehicle comprises a plurality of wheels which are part of a chassis, for instance. At least one of the wheels, preferably at least two, for example four of four wheels, are configured as drive wheels and are in a torque-transmitting connection with a drive motor which provides a drive torque that is translated into propulsion by the drive wheels. The drive motor is an internal combustion engine and/or an electric drive motor, for example.

BRIEF DESCRIPTION OF THE DRAWINGS

The above-described invention is discussed in detail in the following in the context of the relevant technical background with reference to the accompanying drawings which show preferred embodiments. The invention is not limited in any way by the purely schematic drawings, whereby it should be noted that the drawings are not true to scale and are not suitable for defining dimensional relationships. The figures show.

DETAILED DESCRIPTION OF THE INVENTION

Figure 1:
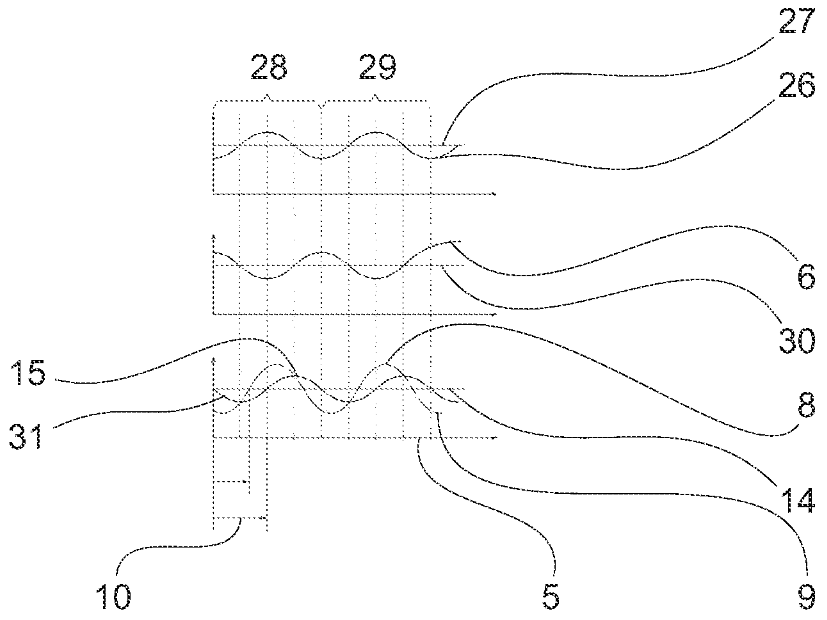
FIG. 1 is a diagram of a pilot control torque, an actual speed and a fluid flow over a gear angle.

FIG. 1 shows a diagram of a pilot control torque 9, an actual speed 6 and a fluid flow 26 over a gear angle 5. The gear angle 5 is plotted on the abscissa and the speed (for example in revolutions per minute), the fluid flow 26 (for example in cubic meters per second) and the gear angle 5 (in degrees) are plotted on the ordinate.

The design of a gear pump 1 causes fluctuations in the fluid flow 26, i.e., the volume flow of a fluid conveyed by means of the gear pump 1. The fluctuations lead to the sinusoidal shape of the fluid flow 26 in relation to the gear angle 5 shown here, for instance. The fluctuations are in a range of, for example, one to three percent around a fluid flow average value 27. Such fluctuations lead to undesirable noise emission, for example.

A tooth engagement of the gear pump 1 therefore causes a full phase cycle, i.e., extends over a phase angle of 360°. The diagram shown here is for a gear pump 1 comprising 15 teeth 11 on the smaller driven internal gear 39. A tooth engagement, i.e., a phase angle range of 360°, thus corresponds to a gear angle range of 24°. The diagram shows a first tooth engagement 28 and a second tooth engagement 29.

To compensate these fluctuations, the actual speed 6 of the gear pump 1 is controlled such that it oscillates in the opposite direction. In other words, a base speed 30, which is the average value of the actual speed 6, is overlaid with a sinusoidal modulated speed oscillation. The course of the actual speed 6 is 180° out of phase with the fluid flow 26, i.e., a maximum of the actual speed 6 occurs at the same gear angle 5 as a minimum in the fluid flow 26 and vice versa. The fluid flow fluctuations can thus be at least partly compensated.

The actual speed 6 is modulated via a torque control. For this purpose, a drive torque 14, which forms a mean value here, is overlaid with a sinusoidal pilot control torque 9. To generate a desired actual torque 31 with the pilot control torque 9, the pilot control torque 9 is amplified in amplitude 8 in relation to the desired actual torque 31 and shifted by a phase angle to correct the transmission behavior of a torque controller and the electrical path (to generate phase currents and electrical fields in the drive unit of the gear pump).

The phase progression of an actual torque 31 for generating the desired actual speed 6 is shifted forward (to the left in the illustration) compared to the course of the actual speed 6 by a 90° phase angle and has the same frequency as the actual speed 6 and the fluid flow 26. The amplitude 8 of the actual torque 31 is calculated on the basis of an inertia factor, a leakage factor and a pulsation factor according to the formula:

$$3.3\colon\ \overline{M}_{n_{ist}} = \psi \cdot \frac{\pi^2}{60} \cdot |\tilde{n}_{ist}| \cdot n_{ist} \cdot f_p$$

ψ is the inertia factor, $f_p$ is the pulsation factor, $\cdot n_{ist}$ is the actual speed and $\tilde{n}_{ist}$ is the leakage factor.

To generate this actual torque 31, the pilot control torque 9 is determined by means of a control device 2, which comprises a computing device 3 and a memory device 4. The pilot control torque 9 is determined according to the formula, for example:

$$M_n = \overline{M}_n \cdot \sin[15 \cdot (\varphi_w - \varphi_k - \varphi_{\overline{M}})] \qquad 3.5\colon$$

$\overline{M}_n$ is the amplitude 8 of the pilot control torque 9, Pw is the gear angle 5, $\varphi_{\overline{M}}$ is the modulation angle 7 and 15 is the number of teeth.

The phase angle of the pilot control torque 9 is corrected by two offset values. One offset value is the predetermined correction angle 10, which specifies the angular offset between a zero crossing of gear angle 5 and a zero crossing of the phase angle of the torque. The correction angle 10 reflects the angular offset between the zero position of the drive shaft of the gear pump 1 and the tooth engagement in degrees of gear angle 5, for instance. The correction angle 10 is preferably determined at the factory, once in a preliminary calibration measurement.

The modulation angle 7 is determined as the second angular offset. The modulation angle 7 is determined as a function of the actual speed 6 according to the formula:

$$1.1\colon\ \varphi_{\overline{M}} = \frac{1}{a} \cdot \left[-\arctan\left(\frac{\pi}{2} \cdot |n_{ist}| \cdot \tau_M\right) - \frac{\pi}{2} \cdot T_{tot} \cdot |n_{ist}|\right]$$

Here, $\varphi_{\overline{M}}$ is the modulation angle, a is the number of teeth (15), $n_{ist}$ is the actual speed, $\tau_M$ is a time constant and $T_{tot}$ is a dead time of the torque controller. The modulation angle 7 corresponds to a phase correction of the transmission behavior of the torque controller in degrees relative to the gear angle 5, i.e., one shaft revolution of the drive shaft of the gear pump 1, for example.

The actual amplitude 15 of the actual torque 31 is corrected by a correction factor. The correction factor is preferably calculated using the following formula:

$$3.1\colon f_{korr} = \sqrt{1 + \left(\frac{\pi}{2} \cdot |n_{ist}| \cdot \tau_M\right)^2}$$

The actual amplitude 15 is calculated using the formula 3.3.

Figure 2:
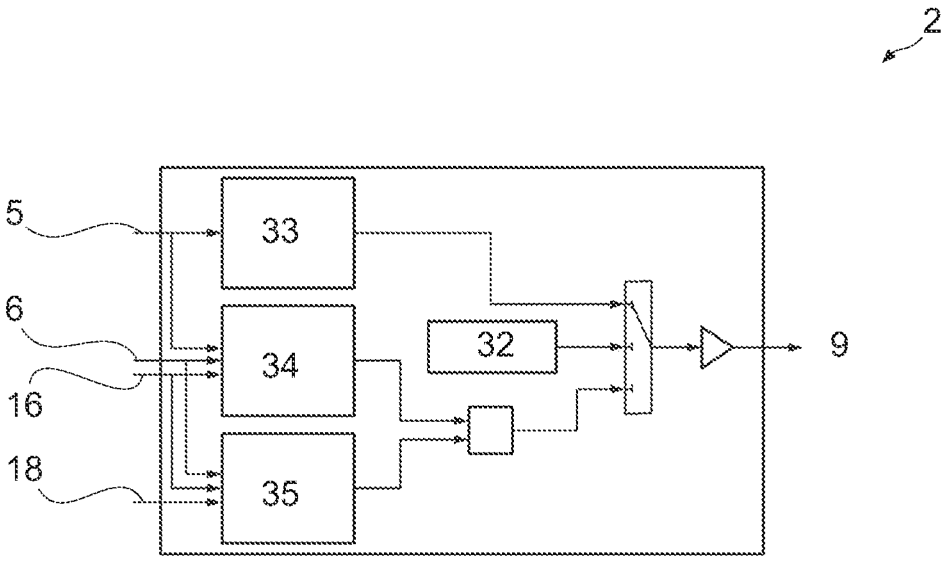
FIG. 2 is a schematic block diagram of the control system of the gear pump.

FIG. 2 shows a schematic block diagram of the control system of the gear pump 1. A decision parameter 32 can be used to select between a test mode and an operating mode. The test mode is illustrated by a correction angle block 33, which is the determination of the correction angle 10, for example in a preliminary calibration measurement. The operating mode is illustrated by a pilot control torque block 34, by means of which the modulation of the pilot control torque 9 is carried out, and a regulation block 35, by means of which the modulated pilot control torque 9 is regulated.

The regulation block 35 provides a regulation factor 17, which preferably has a value between 0 and 1, as the output variable. This value is multiplied by the pilot control torque 9 modulated in pilot control torque block 34 to regulate the pilot control torque 9.

Figure 3:
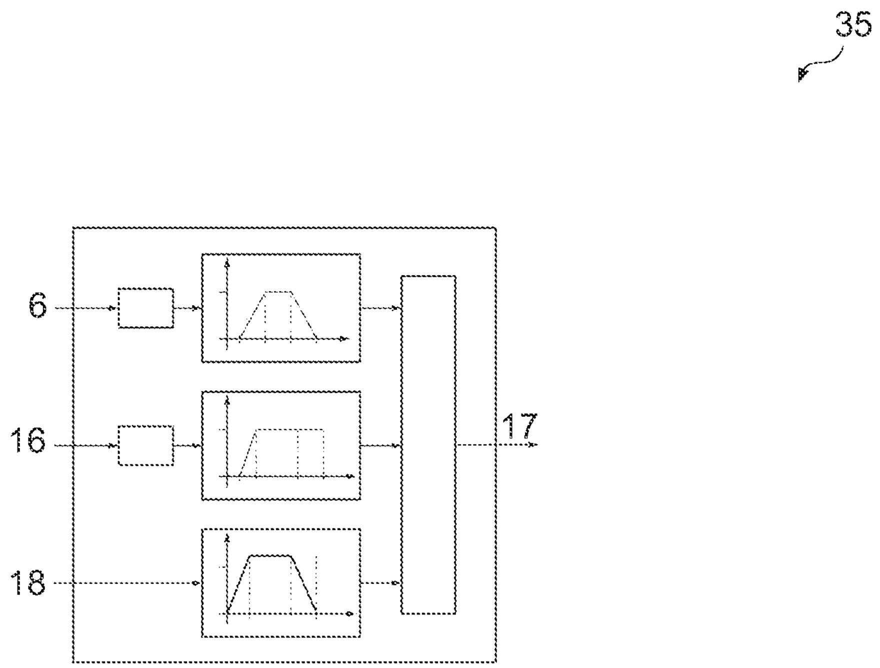
FIG. 3 is a regulation block according to FIG. 2.

FIG. 3 shows the regulation block 35 according to FIG. 2 in detail. The regulation block 35 receives the measured actual speed 6, the differential pressure 16 at the gear pump 1 and the vehicle speed 18 as input variables. A characteristic diagram, which assigns a regulation factor 17 to the respective input variable, is preferably kept for each of the input variables by means of the memory device 4. Alternatively, a calculation formula for the regulation factor 17 is stored as a function of the input variable, for example.

The regulation factor 17 for a medium speed range of the actual speed 6 has the value 1, for instance, and decreases for lower or higher speeds. In a range between 750 revolutions per minute and 1500 revolutions per minute, for example, the regulation factor 17 has the value 1. At less than 250 revolutions per minute or more than 2000 revolutions per minute, for example, the regulation factor 17 has the value 0.

For a low differential pressure 16, for example, the regulation factor 17 has the value 0 and for a high differential pressure 16 it has the value 1. Between the high and the low differential pressure 16, the regulation factor 17 is described by a straight line, for instance. The low differential pressure 16 is 10 bar and the high differential pressure 16 is 25 bar, for example.

The regulation factor 17 for a medium speed range of the vehicle speed 18 has the value 1, for instance, and decreases for lower or higher speeds. In a range between 10 kilometers per hour and 100 kilometers per hour, for example, the regulation factor 17 has the value 1. At 0 kilometers per hour or more than 150 kilometers per hour, for example, the regulation factor 17 has the value 0.

The lowest of the three thus determined regulation factors 17 is selected by means of a decision function, and used to regulate the pilot control torque 9 as discussed with reference to FIG. 2.

Figure 4:
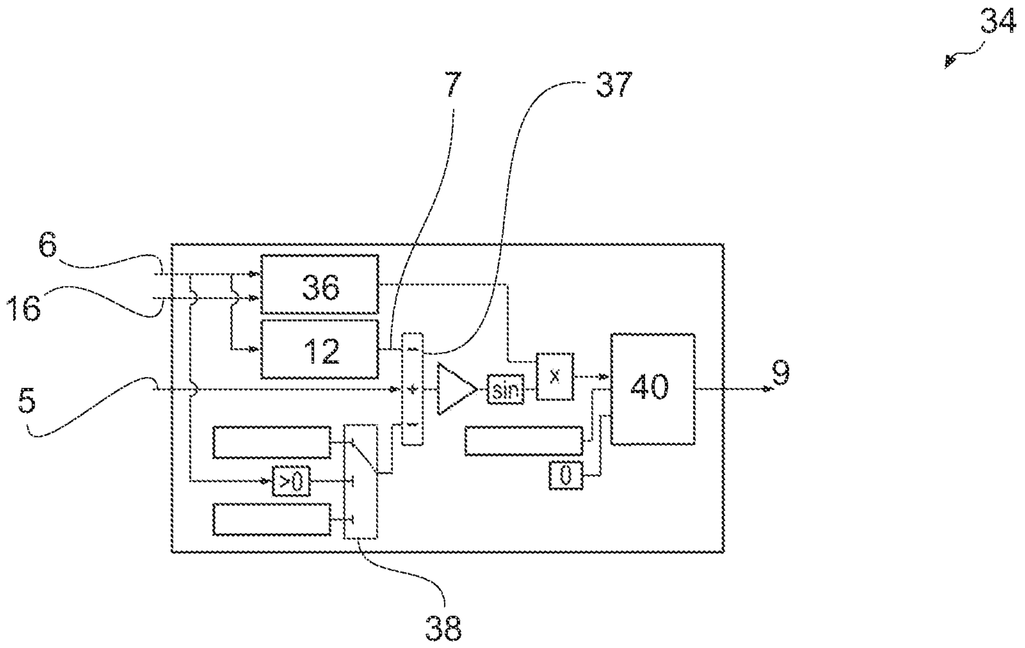
FIG. 4 is a pilot control torque block according to FIG. 2.

FIG. 4 shows a pilot control torque block 34 according to FIG. 2 in detail. The pilot control torque block 34 receives the actual speed 6, the differential pressure 16 and the gear angle 5 as input variables. In an amplitude block 36, the amplitude 8 of the pilot control torque 9 is determined using the formula:

$$3.4\colon \overline{M}_n = \sqrt{1 + \left(\frac{\pi}{2} \cdot |n_{ist}| \cdot \tau_n\right)^2} \cdot \underbrace{\psi \cdot \frac{\pi^2}{60} \cdot |\tilde{n}_{ist}| \cdot n_{ist} \cdot f_p}_{\overline{M}_{n_{ist}}}$$

and/or a characteristic diagram as a function of the input variables actual speed 6 and differential pressure 16. The correction factor, which is multiplied by the actual amplitude 15 of the actual torque 31, is stored in a characteristic diagram as discussed above, for example.

In a PT element 12, also referred to here as a modulation angle block, the modulation angle 7 of the pilot control torque 9 is modulated as a function of the actual speed 6. For this purpose, for example a characteristic diagram, which depicts the modulation angle 7 as a function of the actual speed 6, is stored in the memory device 4. The modulation angle 7 can alternatively or additionally be calculated using Formula 1.1, for example.

In a sum block 37, the modulation angle 7 determined in the modulation angle block or the PT element 12 and the correction angle 10 determined in the correction angle block 33 (see FIG. 2) are subtracted from the measured gear angle 5. For this purpose, the correction angle 10 determined in the preliminary calibration measurement according to the correction angle block 33 is kept by the memory device 4. In a direction block 38, a suitable sign for the correction angle 10 is determined as a function of the direction of rotation of the gear 39 or the drive shaft of the gear pump 1, for example.

The pilot angle summed up in the sum block 37 is multiplied by the number of teeth 11 of the driven gear 39 or the number of pairs of teeth of the gear pump 1 over a 360° gear angle 5 and the sine is calculated. The function of the pilot control torque 9 then corresponds to a multiplication of the amplitude 8 by the thus determined phase response. Before the pilot control torque 9 is output as the output variable, a maximum value limitation or a minimum value limitation takes place in a filter block 40, for example.

Figure 5:
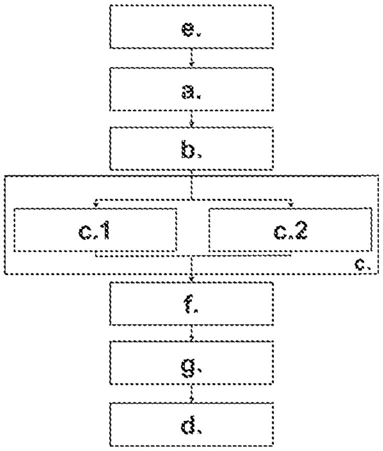
FIG. 5 is a flow chart of a method for controlling a gear pump.

FIG. 5 shows a flow chart of a method for controlling a gear pump 1, for example according to the diagram and block diagram of FIG. 1 to FIG. 4.

In a step e. the preliminary calibration measurement is carried out and the predetermined correction angle 10 determined. The preliminary calibration measurement is preferably carried out once at the factory.

In the preliminary calibration measurement, a specific test speed, a specific test torque and a specific test differential pressure, for example, are set on the gear pump 1. A preferably sinusoidal test oscillation is iteratively applied to the test torque and the differential pressure level is measured. The test phase angle of the test torque is shifted to iteratively determine the test phase angle having the lowest differential pressure level.

For each iterative measurement of the differential pressure level, the test phase angle of the test torque is shifted by no more than 2° (two degrees), no more than 1° (one degree) or no more than 0.5° (half a degree) of the gear angle 5, for example. The differential pressure level is calculated using a fast Fourier transform or a bandpass filter, for instance.

This results in a test angle of $$2.1\colon \varphi^{\psi}_{Test} = i^* \cdot \frac{\pi}{180}$$

wherein i* is the distance of the test phase angle, with which the differential pressure level is the lowest, relative to a zero crossing of the gear angle 5 in ° (degrees).

The predetermined correction angle 10 is determined on the basis of the test angle, for example using the following formula:

$$2.2\text{:}\ \varphi_k = i^* \cdot \frac{\pi}{180} - \frac{1}{a} \cdot \left[ -\arctan\left(\frac{\pi}{2} \cdot |n_{Test}| \cdot \tau_M\right) - \frac{\pi}{2} \cdot \Delta T_{tot} \cdot |n_{Test}| \right]$$

The predetermined correction angle 10 is therefore an offset value for defining the tooth engagement behavior, and with it the volume flow pulsation, in relation to the gear angle 5.

In a step a., the gear angle 5 is acquired by means of the angle encoder. The gear angle 5 is an angle of a drive shaft of the gear pump 1, for example. The angle is measured by means of an angle encoder using a reference point on the drive shaft, for example. The actual speed 6 is acquired as well. The actual speed 6 is a speed of the gear 39, preferably an internal gear 39, of the gear pump 1 or the drive shaft, for example. The actual speed 6 is preferably also determined by means of the angle encoder or with a separate measuring device.

In step b. now, a relationship between the modulation angle 7 for determining the phase of the pilot control torque 9 and the actual speed 6 of the gear pump 1 is kept on the memory device 4. The relationship between the modulation angle 7 and the actual speed 6 includes a characteristic diagram, an analytical description, for instance a model, or another algorithm, for example. A relationship between the amplitude 8 of the pilot control torque 9 and the actual speed 6 of the gear pump 1 is kept on the memory device 4 as well. The relationship between the amplitude 8 and the actual speed 6 includes a characteristic diagram, an analytical description, for instance a model, or another algorithm, for example.

In a step c., the pilot control torque 9 is modulated by means of the computing device 3 on the basis of the acquired gear angle 5, the predetermined correction angle 10, the modulation angle 7, the number of teeth 11 of the gear pump 1 and the amplitude 8.

In a step d., the gear pump 1 is then driven by means of the drive torque 14 overlaid with the pilot control torque 9. The drive torque 14 is provided by means of a drive unit 13 controlled by the control device 2, preferably an electric motor. A torque controller is used.

The modulation angle 7 is determined in a PT element 12 and is carried out in a step c1. The amplitude 8 is determined, preferably in parallel, in a step c2. Steps c1. and c2. are preferably continuous.

A maximum value limitation or a minimum value limitation of the pilot control torque 9 is then carried out in an optional step f. It is thus possible to prevent an overreaction or negative values, for instance.

The pilot control torque 9 is moreover regulated in an optional step g., as described above. The pilot control torque 9 can be dimmed as a function of the vehicle speed 18, the differential pressure 16 of the gear pump 1 and/or the actual speed 6, for example, for instance to avoid inappropriately high amplitudes 8 of the pilot control torque 9 at low speeds or vehicle speeds 18.

In a step d., the pilot control torque 9 overlaid with the drive torque 14 is used to control the gear pump 1 by way of the drive unit 13.

Figure 6:
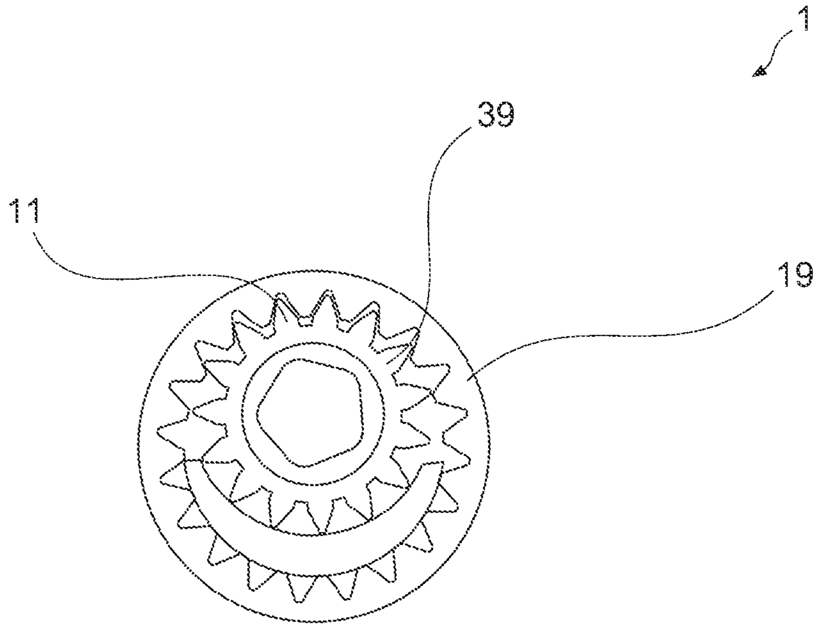
FIG. 6 is a schematic illustration of a gear pump.

FIG. 6 shows a gear pump in a schematic illustration. According to the illustration, the gear pump 1 is a crescent pump. The internal gear 39 can be driven by a drive unit 13. As can be seen, the internal gear 39 comprises 15 teeth 11. The number of teeth 11 of the driven gear 39 determines the frequency at which the fluid flow 26 oscillates in relation to the rotation of the drive shaft, because this determines the number of tooth engagements per revolution of the drive shaft or per 360° gear angle 5. The teeth 11 of the internal gear 39 engage the teeth 11 of the gear ring 19, so that said gear ring is caused to rotate as well.

As can be seen, a crescent is disposed in a lower portion of the gear pump 1. According to the illustration, the gears 39 rotate counterclockwise, i.e., in a left hand rotation. The gear pump accordingly comprises an inlet area in a portion on the left in the illustration, into which the fluid is drawn with low pressure. The rotation of the gears 39, 19 causes the fluid to be conveyed along the crescent and thereby compressed. An outlet region, out of which the fluid is pushed with higher pressure, is accordingly disposed on the right side in the illustration.

Figure 7:
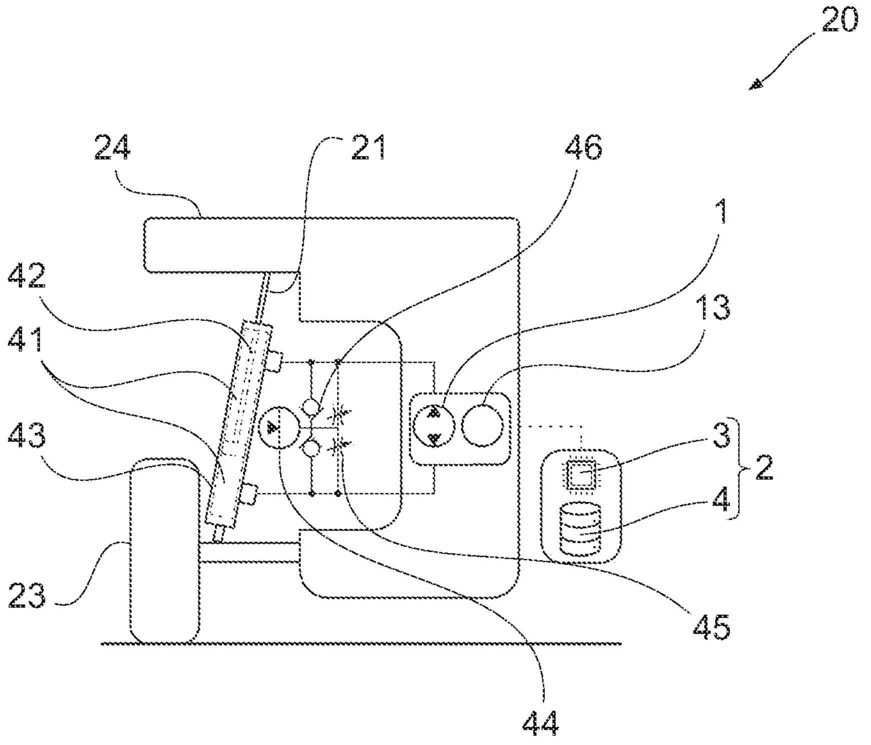
FIG. 7 depicts a chassis hydraulics with a gear pump.

FIG. 7 shows a chassis hydraulics 20 comprising a gear pump 1. The gear pump 1 is preferably controlled by a control device 2 according to FIG. 1 to FIG. 4. This is a gear pump 1 according to FIG. 6, for instance.

The gear pump 1 is disposed in a hydraulic circuit for conveying a hydraulic fluid. For this purpose, the gear pump 1 is fluidically connected to two chambers 41 of a damper device 21 on both sides of a working piston 42 in a cylinder 43.

An equalizing container 44 for the hydraulic fluid and a circuit which, as can be seen, consists of two restrictors 45 and two check valves 46, are provided as well for regulating the damper device 21.

One end of the damper device 21 is connected to a vehicle body 24 of a motor vehicle 22 and one end is connected to a wheel 23 of the motor vehicle 22 in order to damp said body and said wheel when they move relative to one another.

Figure 8:
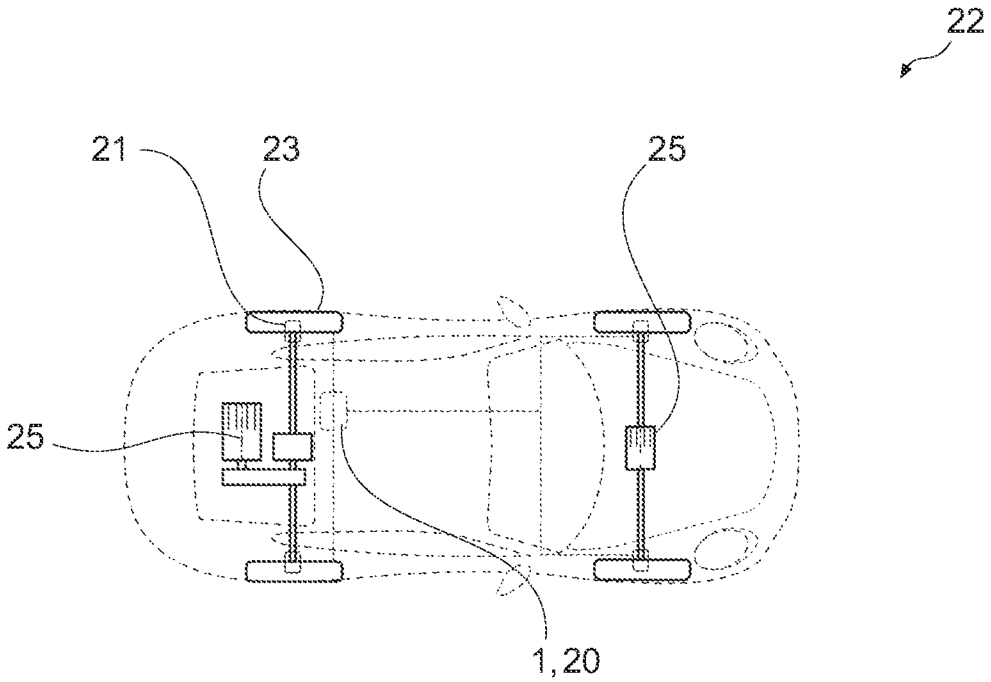
FIG. 8 depicts a motor vehicle comprising a chassis hydraulics according to FIG. 7.

FIG. 8 shows a motor vehicle 22 comprising a chassis hydraulics 20 according to FIG. 7. The motor vehicle 22 comprises four wheels 23, which, according to the illustration, are all configured as drive wheels and are connected to the vehicle body 24 by means of a damper device 21 (as can be seen, this is provided with reference signs once pars pro toto). Relative movements and accelerations between the vehicle body 24 and the wheels 23 can be damped by means of the chassis hydraulics 20 or the damper device 21. Pitching movements, yaw movements and rolling movements due to vehicle accelerations, uneven roads, cornering or other reasons, for instance, can be damped.

As can be seen, the motor vehicle 22 further comprises two drive motors 25, one for the front axle and one for the rear axle, which are both connected to the respective wheels 23 in a torque-transmitting manner.

The invention relates to a method for controlling a gear pump to compensate a tooth engagement-induced volume flow pulsation and thus reduce noise emissions.

The features of the following claims can be combined in any technically meaningful manner, for which purpose it is also possible to consult the explanations from the following description and features from the figures, which comprise additional configurations of the invention.

What is claimed is:

1. A method for controlling a gear pump by way of a control device to compensate a tooth engagement-induced volume flow pulsation, wherein the control device includes an acquisition unit, a computing device, and a memory device, wherein the method comprises at least the following steps:

a. by way of the acquisition unit, acquiring a gear angle and an actual speed of the gear pump;
b. by way of the memory device, maintaining a relationship between a respective modulation angle and an amplitude of a pilot control torque of the gear pump to compensate the volume flow pulsation to an actual speed of the gear pump;
c. by way of the computing device, modulating the pilot control torque on a basis of the acquired gear angle, a predetermined correction angle, the modulation angle, a number of teeth of the gear pump and the amplitude, wherein the modulation angle is calculated using a PT element with the actual speed as an input variable; and
d. by way of a drive unit, driving the gear pump with a drive torque overlaid with the modulated pilot control torque.

2. The method according to claim 1, wherein the predetermined correction angle is determined in a step e. by way of a one-time and preliminary calibration measurement.

3. The method according to claim 1, wherein, in a step c2., the amplitude of the pilot control torque is modulated using an actual amplitude which is dependent on the actual speed and a correction factor which is dependent on the actual speed.

4. The method according to claim 3, wherein, in step c2., the actual amplitude is further determined as a function of a leakage factor, wherein the leakage factor is dependent on the actual speed and a differential pressure at the gear pump.

5. The method according to claim 3, wherein the correction factor of the amplitude and/or the modulation angle are determined continuously.

6. The method according to claim 1, wherein, in a step f. a maximum value limitation of the pilot control torque is carried out.

7. The method according to claim 1, wherein, in a step g. the pilot control torque modulated in step c. is regulated by way of a regulation factor, wherein the regulation factor is determined as a function of the vehicle speed, the differential pressure, and/or the actual speed.

* * * * *